Feb. 20, 1923.

D. HOLLIDAY.
CLOTHESLINE HITCH.
FILED AUG. 22, 1922.

1,445,683.

D. Holliday, Inventor,

By C. A. Snow & Co.
Attorneys.

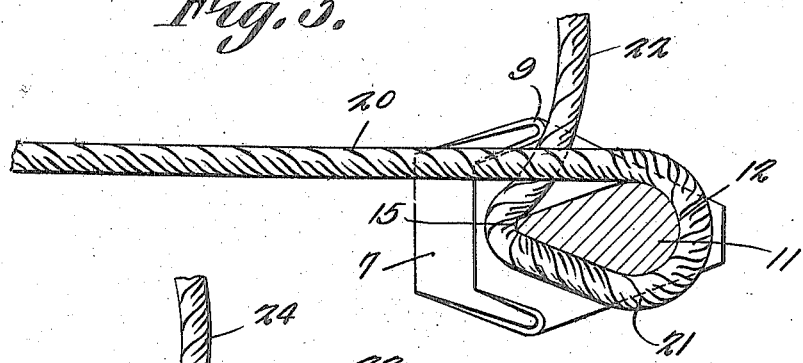
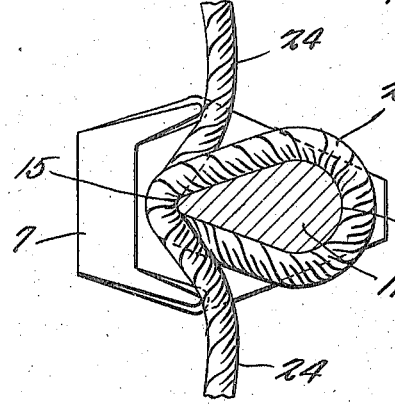
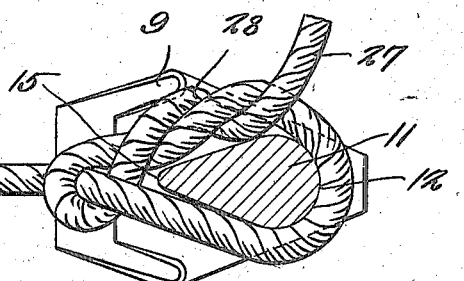
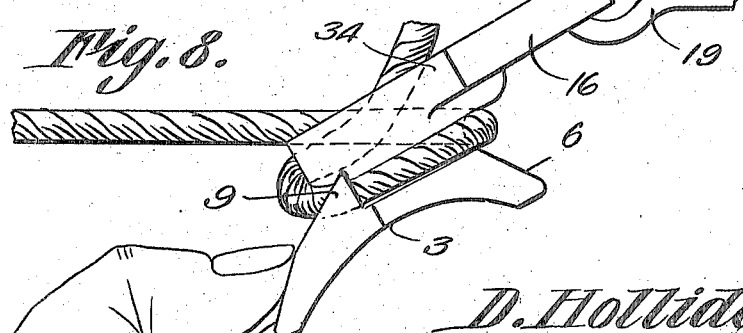

Patented Feb. 20, 1923.

1,445,683

UNITED STATES PATENT OFFICE.

DAVID HOLLIDAY, OF ST. PAUL, MINNESOTA.

CLOTHESLINE HITCH.

Application filed August 22, 1922. Serial No. 583,619.

*To all whom it may concern:*

Be it known that I, DAVID HOLLIDAY, a citizen of the United States, residing at St. Paul, in the county of Ramsey and State of Minnesota, have invented a new and useful Clothesline Hitch, of which the following is a specification.

This invention aims to provide a simple means for belaying a line, such as a clothes line, the line being held securely and it being possible to cast off the line by a simple manipulation of the device forming the subject matter of this application, the device being so constructed that the aforesaid operation may be carried out expeditiously.

Another object of the invention is to provide a structure of the sort mentioned upon which many different hitches may be made.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
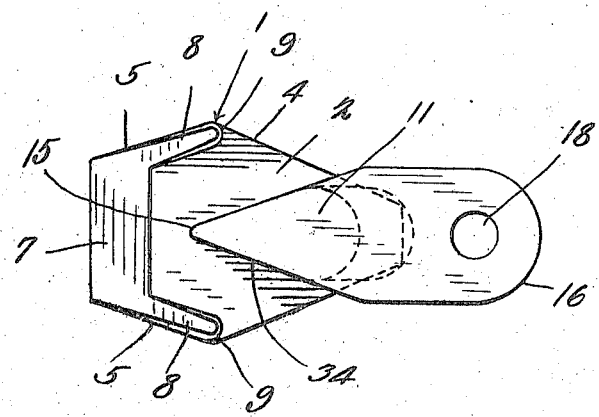
Figure 2:
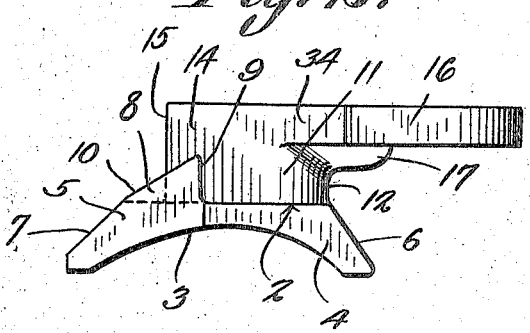
Figure 3:
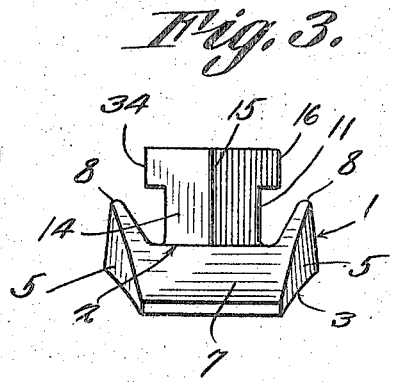
Figure 4:
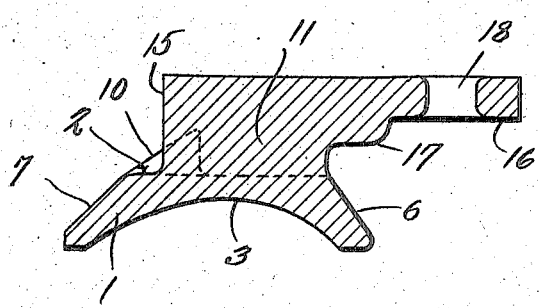

Figure 1 shows in plan, a device constructed in accordance with the invention; Figure 2 is a side elevation; Figure 3 is a front elevation; Figure 4 is a longitudinal section; Figure 5 is a sectional view showing one of the hitches which may be made; Figure 6 is a sectional view showing another of the hitches which may be made; Figure 7 is a sectional view showing a third hitch which may be made; Figure 8 is a side elevation illustrating the operation of the structure.

The device forming the subject matter of this application preferably is made of metal and includes a base 1 having a flat upper surface 2 and provided with a concaved lower surface 3. In top plan, as shown in Figure 1, the base is provided with rearwardly converging edges 4 and with forwardly converging edges 5, the base having a rear downwardly inclined surface 6 and a forward downwardly inclined surface 7. Ears 8 of approximately triangular form upstand from the flat upper surface 2 of the base 1 and are located closely adjacent to the forwardly converging edges 5 of the base 1, the rear edges of the ears 8, marked by the numeral 9, being disposed at right angles to the flat upper surface 2 of the base 1 or nearly so. The upper edges 10 of the ears 8 slant downwardly and forwardly and merge into the forwardly and downwardly inclined surface 7 of the base 1. A neck 11 is disposed at right angles to the base 1 and is formed integrally therewith, the neck being connected to the base intermediate the ends of the base. The neck 11 has a convexed rear edge 12 and forwardly converging surfaces 14, the said surfaces 14 being disposed at right angles to the flat upper surface 2 of the base 1 and defining an edge 15 located in advance of a line connecting the rear edges 9 of the upstanding triangular ears 8. A top 16 is connected to the upper end of the neck 11 and is formed integrally therewith, the top 16 projecting rearwardly from the neck 11 and being connected to the neck by an integrally formed reinforcing rib 17. The top 16 has converging forwardly edges 34, coinciding with the converging surfaces 14 of the neck 11. In the rear portion of the top 16 there is an opening 18 adapted to receive a suspension element 19 whereon the device forming the subject matter of this application may be carried.

The device may be used in a variety of ways. For instance, as shown in Figure 5, the line or flexible element 20 may be formed into a loop 21 around the neck 11, the line 20 extending along one of the ears 8, and the end 22 of the line being extended beneath the body portion of the line, across the rear edge 9 of the said ear. The construction is such that the end 22 of the loop will be bound, and the loop will remain firmly about the neck 11. If desired, as shown in Figure 8, the thumb or finger of an operator may be placed on the surface 7 of the base 1 and the device may be tilted downwardly, whereupon the line 20 will ride upwardly on the slanting surface 10 of the ear 8 and be released, the line 20 then paying out freely. Owing to the fact that the edge shown at 15 is located forwardly of a line connecting the rear edges 9 of the ears 8, the loop 21 will remain securely in the position shown in Figure 5, until the device is tilted downwardly as disclosed in Figure 8.

In Figure 6 the loop appears at 23 and the ends of the loop are extended in opposite directions across the rear edges 9 of the ears 8, as shown at 24.

If preferred, as disclosed in Figure 7, the line 25 may be engaged in a loop 26 around the neck 11, one end of the line, marked by the numeral 27 being connected as at 28 around one side portion of the loop, the result being the well known timber hitch. The several hitches above shown are merely typical of the uses to which the device may be put, it being possible to fashion a wide variety of hitches about the neck 11.

What is claimed:—

1. A device of the class described, comprising a base, a top and a neck connecting the base and the top, the base having a forwardly and downwardly inclined surface at its forward end, and being provided with upstanding ears located on opposite sides of the neck, the ears having forwardly and downwardly inclined upper edges merging into the forwardly and downwardly inclined surface of the base.

2. A device of the class described comprising a base, a top, and a neck connecting the base and the top, the base having a forwardly and downwardly inclined surface at its forward end and being provided with upstanding ears located on opposite sides of the neck, the upper edges of the ears slanting downwardly and forwardly and merging into the forwardly and downwardly inclined surface of the base, the neck having converging surfaces defining an edge disposed approximately at right angles to the base, said edge being located in advance of a line connecting the rear edges of the ears.

In testimony that I claim the foregoing as my own, I have hereto affixed my signature.

DAVID HOLLIDAY.